W. BOLTON AND E. T. BISHOP.
MEANS FOR MEASURING THE PITCH OF SCREWS AND THE LIKE.
APPLICATION FILED JULY 24, 1918.
1,338,670.
Patented May 4, 1920.
3 SHEETS—SHEET 1.
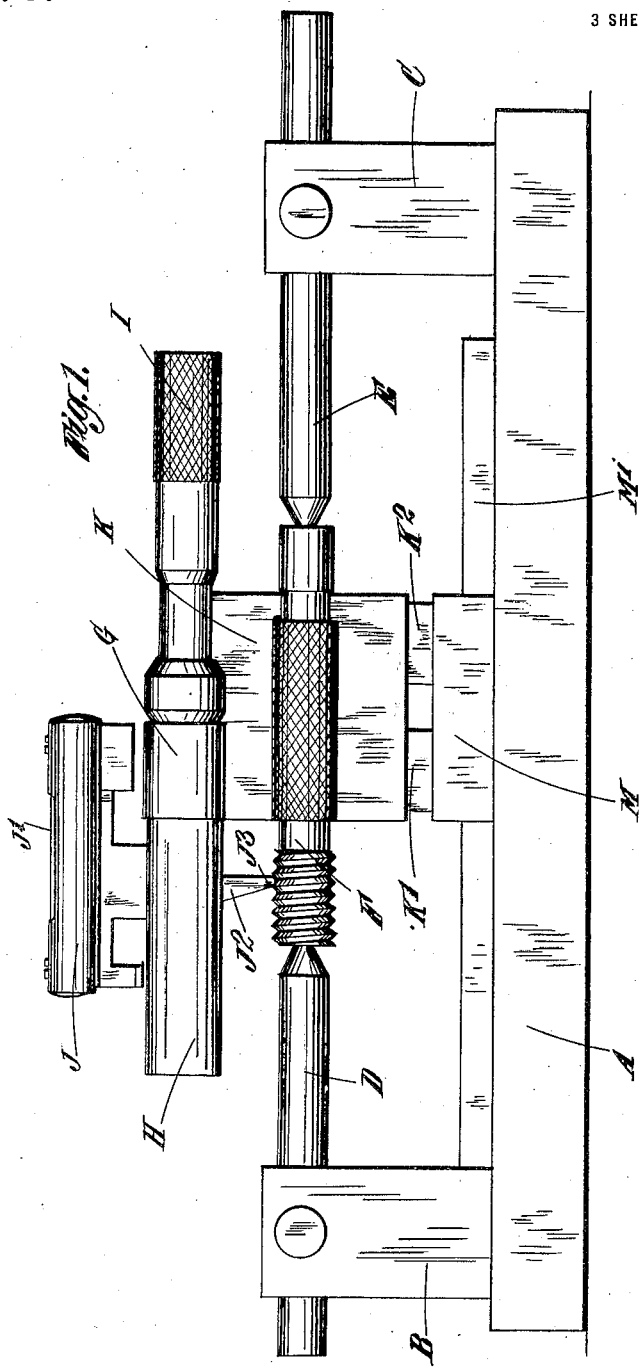
INVENTOR
Wilford Bolton + Ernest Thomas Bishop,
By Bacon & Milans, Attorneys.

W. BOLTON AND E. T. BISHOP.
MEANS FOR MEASURING THE PITCH OF SCREWS AND THE LIKE.
APPLICATION FILED JULY 24, 1918.
1,338,670.  Patented May 4, 1920.
3 SHEETS—SHEET 2.
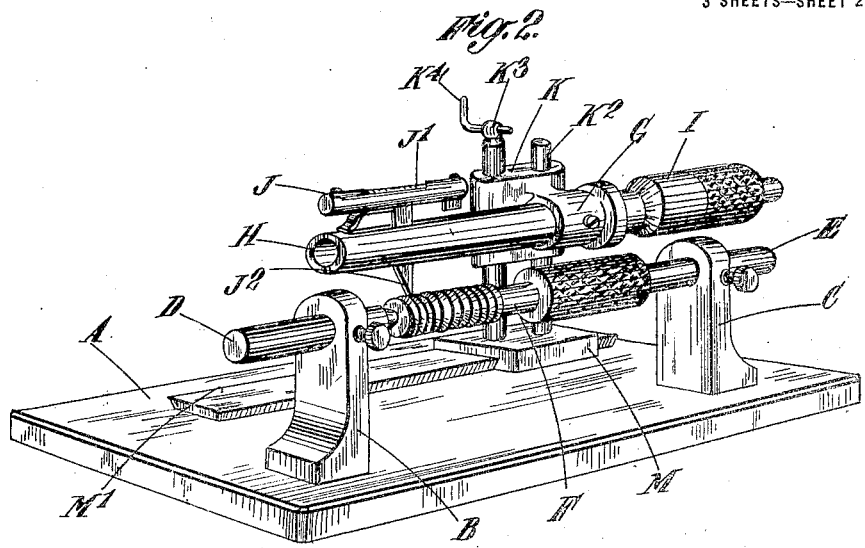
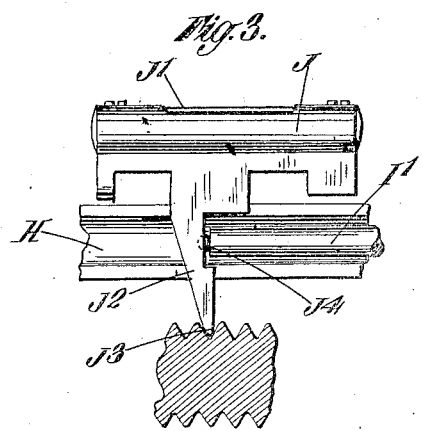
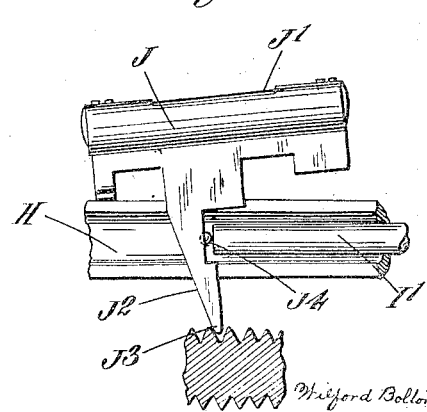

W. BOLTON AND E. T. BISHOP.
MEANS FOR MEASURING THE PITCH OF SCREWS AND THE LIKE.
APPLICATION FILED JULY 24, 1918.
1,338,670.
Patented May 4, 1920.
3 SHEETS—SHEET 3.
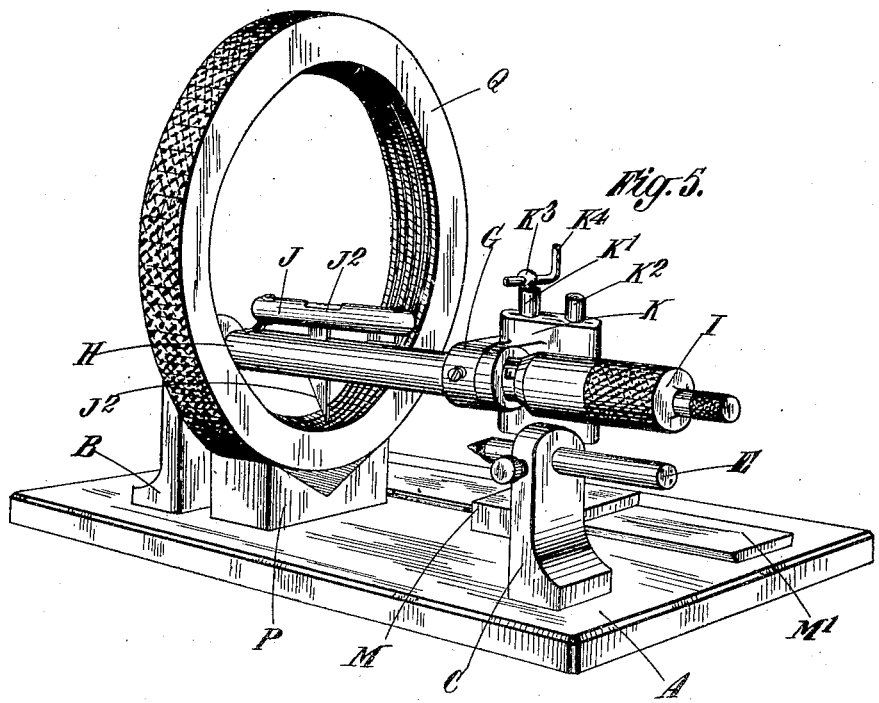
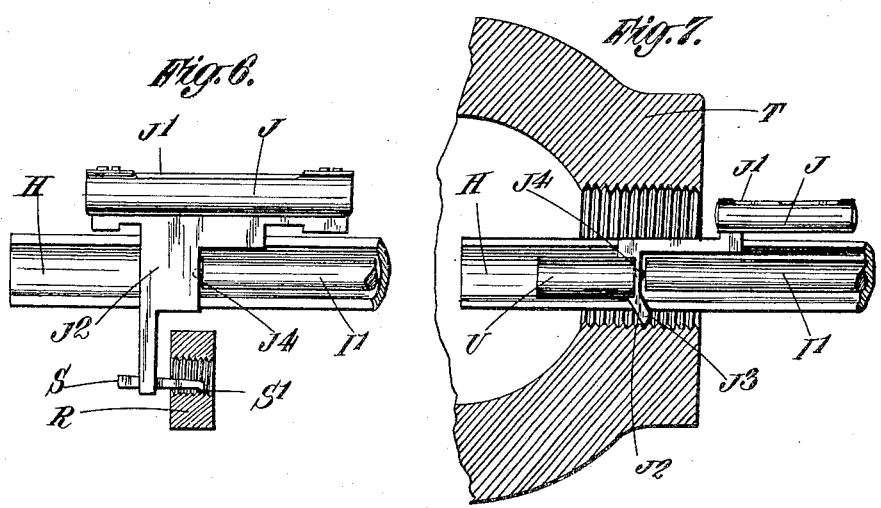
INVENTOR

UNITED STATES PATENT OFFICE.

WILFORD BOLTON, OF ACCRINGTON, AND ERNEST THOMAS BISHOP, OF READING, ENGLAND.

MEANS FOR MEASURING THE PITCH OF SCREWS AND THE LIKE.

1,338,670.      Specification of Letters Patent.      Patented May 4, 1920.

Application filed July 24, 1918. Serial No. 246,582.

*To all whom it may concern:*

Be it known that we, WILFORD BOLTON, engineer, and ERNEST THOMAS BISHOP, engineer, subjects of the King of Great Britain and Ireland, residents, respectively, of 29 Persia street, Accrington, Lancashire, England, and The Laurels, Burghfield, Reading, Berkshire, England, have invented an Improved Means for Measuring the Pitch of Screws and the like, of which the following is the specification.

Apparatus hitherto devised or proposed for the purpose of measuring the pitch or the distance from the one thread of a screw to the next with a reasonable degree of accuracy has been of a complicated nature, troublesome in operation and generally expensive, involving frequently the use of a prism or mirrors, and suitable only for use in a laboratory.

The object of this invention is to provide an apparatus for measuring the pitch of screws and the like, of very simple construction, having few parts, giving accurate readings in a minimum of time, and cheap to manufacture, that can be placed in the hands of foremen or workmen in the workshop.

According to our invention we provide an unsecured or loosely mounted member which we term a tilting beam; the said tilting beam is fitted within a slotted tube or like carrier, suitably and adjustably supported upon a base plate. A micrometer is secured at one end of the said slotted tube or carrier in such a manner that when screwed forwardly it is adapted to engage a projection, preferably of spherical form, upon the said tilting beam. The said tilting beam is provided with a spirit level above the slotted tube or carrier and has preferably integrally formed therewith or secured thereto a foot or downwardly projecting member, the lower end of which is adapted to engage within a thread of the screw, the pitch of which is to be measured. The said screw is supported between centers below the said tilting beam and slotted carrier, or other holding means are provided. The micrometer head is turned and adjusted until the spirit level on the tilting beam indicates the true horizontal position, and a micrometer reading is then taken. The micrometer head is then screwed forward thereby lifting the foot of the tilting beam from one thread to the next. The tilting beam is then readjusted to the horizontal position by the micrometer and the level, and a new reading taken. The second reading is subtracted from the first which gives the desired measurement of pitch. Means are provided for the adjustment of the relative height of the micrometer and slotted tube or carrier in order to permit of screws of different diameters being fitted between the centers for measurement and means are provided for adjusting the relative position of the tilting beam and slotted tube longitudinally upon the base plate.

The accompanying drawings illustrate one mode of carrying our invention into effect but with two applications thereof, namely, as applied to an outside thread and to an inside thread, but it will be understood that many modifications may be made in the construction without departing from the scope of our invention.

Figure 1 is an elevation of a pitch measuring apparatus according to our invention for an outside screw thread.

Fig. 2 is a perspective view of a similar apparatus.

Fig. 3 is a detail view showing the interior of the slotted carrier and the micrometer mandrel with the tilting beam in the level position.

Fig. 4 is a similar view showing the tilting beam while being moved forwardly from one thread to the next.

Fig. 5 is a perspective view of the apparatus as applied to an inside screw thread of a large diameter.

Fig. 6 is a view showing the method of application of our invention to a small inside screw thread.

Fig. 7 is a view showing a slight modification of the tilting beam as applied to an inside screw thread.

The base plate A has secured thereon the two supports or pedestals B and C in which are mounted sliding centers D and E for holding the screw thread to be measured. A screw plug gage F with an external thread is shown in Figs. 1 and 2, but it will be understood that other holding means such as a chuck may be employed for the screw, the pitch of which is to be measured. Supported by the adjustable bracket G afterward referred to and arranged vertically above and parallel with the axial line of the centers D and E is a slotted tube H having secured thereto at one end a micrometer head I, the mandrel of which I¹ is capable of longitudinal movement concentrically within the slotted tube H. Loosely mounted within the slotted tube is the tilting beam J which has fitted within it the spirit level J¹. The leg J² of the beam is provided with a rounded end or point J³ which is preferably adapted to engage the flanks or sides of the thread. The point J³ may be integrally formed with the leg. The leg J² of the beam passes through both slots of the slotted tube H, see Figs. 3 and 4, and the beam is so constructed that when it is horizontal and supported on the point of the leg, the center of gravity of the complete beam is not vertically over the point of support, and thus a turning moment is set up tending to cause the beam to move toward the micrometer mandrel I¹. About midway down the leg is secured a ball J⁴ against which the mandrel of the micrometer bears when in operation. The ball J⁴ may be secured in place in any suitable manner, for instance, the ball may be sweated in a recess in the part J² with a film of solder.

When the beam is horizontal, a vertical line through the point of support J³ is tangential to the bearing side of the ball in order to maintain delicacy of movement. By suitable arrangement of the distance of the bearing ball from the point of support J³ which acts as a fulcrum, small movements corresponding to 1/10,000th of an inch on the micrometer are easily detected.

For different diameters of screw threads adjustment is effected within certain limits. The bracket G carrying the slotted tube H is formed integrally with or is secured to the block K which is adapted to slide vertically on the guide standards K¹ K². The standard K¹ is provided with a screw K³ so that rotational movement of the lever K⁴ gives a vertical motion to the block K and the bracket and thereby to the tube or carrier H.

The upright standards K¹ K² are supported by the slide block M which can slide along the dove-tailed guide M¹ fixed to the base plate A parallel to the line of centers. The slide block M and the bracket G can be fixed in any desired relative positions by means of locking screws.

In operation with our apparatus, in the case of measuring the pitch of say a screw plug gage or similar thread, the tilting beam J having been placed in the slotted tube H the necessary horizontal adjustment is made by means of the slide block M and its guide. The height of the slotted tube is then adjusted by means of the lever K⁴. The micrometer I is now adjusted so that the mandrel I¹ commences to bear on the small ball J⁴; the mandrel is then moved farther forward until the beam J is horizontal as indicated by the spirit level J¹. Should the leg J² of the beam by pressure from the mandrel commence to climb up the flank of the thread before the level position is indicated, a small adjustment to the lever K⁴ will correct this. When the position of the beam is level, the rounded joint J³ is in contact with both flanks of the thread, which is necessary for accurate work. After the beam is brought accurately horizontal as indicated by the bubble on the spirit level, the micrometer reading is noted. A further forward motion of the micrometer mandrel forces the beam, still pivoting about the rounded point J³ over into contact with the upper edge of the slotted tube H as shown in Fig. 4; still further movement of the mandrel constrains the beam to commence sliding along the upper edge of the tube H and at the same time to climb up the flank of the thread owing to the easy climbing angle the lower portion of the leg has now assumed. The sliding and climbing movement continue until the point J³ clears the crest of the thread, when, as soon as the leg is clear of the crest, the beam drops automatically into the next thread space. The beam at once commences to tilt about its pivot J³ until the small ball J⁴ is again in contact with the mandrel. The micrometer is again adjusted so as to bring the beam accurately horizontal by the spirit level and the reading is again noted. The difference between this reading and the previous reading gives the desired pitch. The operation is now repeated for the next thread and so on until the desired length of screw has been covered.

It is to be noted that in the event of requiring to measure a screw over a longer distance than is given by the range of the micrometer, this is done by reading over the whole range of the micrometer, then leaving the beam in the last tooth read, the barrel of the micrometer is turned back to the commencing point, the slide block M is unlocked and moved along the guide M¹ until the mandrel and ball J⁴ are again in contact. The slide block is now locked and measuring recommenced.

Referring to Fig. 5 which shows the application of our apparatus to the measurement of inside threads of relatively large diameter, the V-block P is placed on the base plate A and the screw pitch to be measured in the example shown a ring screw gage Q is placed in such a position that the axial center line of the ring is in the same vertical plane as the axial line of the slotted tube H and both axial lines are parallel.

In operating the tilting beam J the slotted tube H and the micrometer I are employed as previously described.

Referring to Fig. 6, the screwed ring or nut R with interior thread is of much smaller diameter. The ring R is held in any convenient manner but it is preferably placed on a small V-block, as described with reference to Fig. 5. The leg J² of the beam J is drilled and fitted with an arm S in the same vertical plane as the axial lines of the slotted tube H and the casing of the tilting beam J carrying the spirit level J¹. The arm S is provided with the pointer S⁴ which is adapted to engage the flanks or sides of the screw thread as previously described with reference to the point J³ in the other figures. The operation of the tilting beam is in this example the same as that previously described.

Referring to Fig. 7, in this example the screwed shell T with interior thread is of larger diameter than that shown in Fig. 6. The tilting beam J has its spirit level tube J¹ displaced longitudinally as shown and the balance weight U is secured on the other side of the leg J² to counterbalance the overhanging spirit level tube J¹. By this arrangement the spirit level is placed in view outside the interior screw of the shell T.

The operation of the apparatus is otherwise the same as previously described.

The beam shown in Fig. 7 is particularly adapted for the measurement of pitch of internal screws on work having a closed end such as shells and the like.

By a modification of the slotted tube bracket G the invention may be applied directly to measure the pitch of work while in a lathe or the like and preferably the apparatus is attached to the cross slide.

It will be observed that a heavy slide which may tend to produce undue wear on the micrometer thread is not required by this invention.

What we do claim as our invention and desire to secure by Letters Patent is:—

1. A device for measuring the pitch of screw threads including a support, a member loosely mounted thereon and supported for tilting movement and having a projecting part adapted to be engaged in the thread to be measured, said member being adapted to be adjusted to a true level, then shifted into the next thread and adjusted to a true level, and a micrometer for adjusting the member, the difference in the reading of the two dead level positions giving the pitch of the thread.

2. The means for measuring the pitch of screw threads comprising a slotted tube, a member having level indicating means, said member being loosely mounted upon the tube to move in the slot thereof, a part on the member adapted to engage within the thread to be measured, and a micrometer to adjust the member to a level position when in engagement with the thread and to move said member along the slot in the tube into other threads.

3. In apparatus for measuring the pitch of screw threads, a support, a member loosely mounted on the support for movement along the same and provided with a spirit level, a foot on said member provided with a point to engage the sides of the thread, a micrometer for adjusting the member, and a spherical bearing between the member and the micrometer.

4. In apparatus for measuring the pitch of screw threads as defined in claim 1, means for vertically adjusting said support and member.

5. In apparatus for measuring the pitch of screw threads of the kind set forth in claim 2, means for adjusting the slotted tube and said member longitudinally with relation to the thread to be measured.

6. In apparatus for measuring the pitch of screw threads of the kind defined in claim 2, means for holding the thread to be measured in the same vertical plane as the slotted tube's axial center.

7. In apparatus for measuring the pitch of screw threads including a slotted tube, a member loosely mounted upon the tube to move in the slot thereof, a leg part on said member provided with a point to engage within the thread to be measured, a micrometer mandrel movable longitudinally in said slotted tube, and a rounded projection upon the leg part of said member adapted to engage the end of the micrometer mandrel.

8. In apparatus for measuring the pitch of screw threads including a support, a member loosely mounted upon the support and having a projecting part adapted to be inserted within an inside thread, said projecting part being adapted to engage in the thread to be measured and to be adjusted to a true level, and then to be shifted into the next thread and adjusted to a true level, and a micrometer for adjusting the member, the difference in the reading of the two dead level positions giving the pitch of the thread.

9. In apparatus for measuring the pitch of screw threads including a support, a member fulcrumed upon said support for tilting movement, said member being provided with level indicating means at one side of its fulcrum and the portion of said member at the other side of the fulcrum being of a weight to overbalance the portion at the other side of the fulcrum point, a part on the member adapted to engage in the thread to be measured and to be adjusted to a true level, then shifted into the next thread and adjusted to a true level, and a micrometer for adjusting said member, the difference in the reading of the two dead level positions giving the pitch of the thread.

WILFORD BOLTON.
ERNEST THOMAS BISHOP.